Patented Feb. 3, 1948

2,435,478

UNITED STATES PATENT OFFICE 2,435,478

POLYAMIDES FROM POLYOCTADECAPOLY-
ENYLAMINE

Howard M. Teeter and John C. Cowan, Peoria,
Ill., assignors to the United States of America
as represented by the Secretary of Agriculture No Drawing. Application January 11, 1946,
Serial No. 640,643

4 Claims. (Cl. 260—404.5)

(Granted under the act of March 3, 1883, as
amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to high molecular-weight polymeric compounds and more particularly to polyamides derived from polyoctadecapolyenyl-amine. It is concerned specifically with the polyamides of polymeric fat acids and the polyamines obtained by hydrogenation of the nitriles of polymeric fat acids.

In application Serial No. 531,966, filed April 20, 1944, of which this application is a continuation-in-part, there are disclosed polyamides of polymeric fat acids and saturated aliphatic polyamines containing two amino groups and not more than 10 carbon atoms, and the process for preparing said polyamides. Polyamides produced in accordance with said application are hard, resinous solids, or tough, rubbery substances which become hard and resinous at temperatures equal to or greater than zero degrees centigrade. These substances are not useful as rubber substitutes, or as ingredients thereof, because of the relatively high temperature at which they become brittle.

We have found that this objection may be overcome by using as the polyamine component of the polyamides, the polyamine obtained by hydrogenation of the nitriles of polymeric fat acids, as hereinafter described.

Natural oleaginous materials of vegetable and animal origin are essentially mixtures of glyceryl esters of various carboxylic acids known as fat acids, the term "fat acid" designating any carboxylic acid which occurs either in the free form or as an ester in fats and oils of vegetable and animal origin. It is common practice in the oil industry to impart desirable properties to oils of the glyceride type by subjecting them to heat treatments known as bodying processes. In the course of such treatments, polymerization of the oil occurs, the amount of polymerization varying with the operating conditions and with the nature of the oil.

Polymerization of oils in an inert atmosphere is due to the presence therein of certain constituents containing radicals of unsaturated acids. Fat acids, the acyl radical of which contains a plurality of double bonds, are capable of undergoing polymerization, for instance, as a result of thermal treatments, and this property is shared by their glycerides and other esters. Examples of polymerizable fat acids are octadecadienoic acids containing two double bonds, like linoleic acid, and octadecatrienoic acids containing three double bonds, such as linolenic and eleostearic acids.

Polymerization of fatty oils takes place by intermolecular condensation at the double bonds of acyl radicals of polymerizable fat acids. The reaction products thus obtained comprise dimeric and trimeric polymers formed, respectively, by the union of two or three molecules of fat acids, and also monomeric unpolymerized compounds. In addition, some products which may be classified as cracked materials are obtained. Thus, polymeric fat acid esters can be obtained from substances comprising polymerizable fat acid esters by subjecting them to a polymerization process followed by elimination of the monomeric fraction of the treated material.

Polymeric fat acids can be produced, for instance, from fatty acids containing glycerides of polymerizable fat acids, such as oils of peanut, cottonseed, wheat, soybean, corn, and linseed, tung, dehydrated castor, Perilla, conjugated linseed oil, and other oils of the drying or semi-drying type.

The oil may be polymerized in the usual manner by thermal treatment. Suitable polymerization catalysts may be used. Where catalysts are used, the temperatures required for polymerization vary with the type of catalyst. The polymeric glycerides may then be isolated, for example, by distillation and converted to the polymeric fat acids by hydrolysis.

Another procedure suitable for the production of polymeric fat acids comprises subjecting a fatty oil of the aforementioned type to alcoholysis with monohydric alcohols, such as methanol and ethanol, thereby converting the glycerides of the fat acids to the corresponding monohydric alcohol esters. Then, these esters are polymerized, yielding monohydric alcohol esters of polymeric fat acids which can be segregated from the other reaction products by distillation and which can be converted to polymeric fat acids by hydrolysis.

Still another method of obtaining polymeric fat acids comprises producing the free fat acids by hydrolysis of the fatty material, polymerizing the free acids in some suitable way, and isolating the polymeric fat acids. This method is applicable to oils whose acids will polymerize without much decarboxylation of the fat acids.

The polymeric fat acid obtained by any of the foregoing procedures consists primarily of dibasic dimeric acids, having an average molecular weight of about 560, admixed with trimeric tribasic fat acid, the average molecular weight of which is approximately 840. This mixture of polymeric fat acids is hereinafter referred to as "polymeric fat acids," a term which includes generically the terms "dimeric fat acid" and "trimeric fat acid."

By well-known chemical methods, it is possible to convert the carboxyl grouping (·COOH) of an organic acid into a nitrile group (—CN). One method consists of converting the acid to its ammonium salt, dehydrating this salt to form the amide, and finally dehydrating the amide to the nitrile by distillation with phosphorus pentoxide. According to another method, ammonia gas is passed through the heated organic acid. By suitable control of time and temperature, the corresponding amide, and finally the nitrile, of the organic acid are formed. These reactions may be summarized briefly by the following equations:

$$R\text{—COOH} \rightarrow RCONH_2 \rightarrow RCN$$

where R represents the non-carboxylic portion of an organic acid. The reactions are equally applicable if more than one carboxyl group is present in the organic acid. Other methods of achieving this chemical change have been used successfully.

These reactions may be applied to polymeric fat acids or separately to the dimeric and trimeric fat acids which comprise polymeric fat acids. The products obtained are nitriles of polymeric fat acids, dimeric fat acids, and trimeric fat acids, respectively. As pointed out previously, polymeric, dimeric, and trimeric fat acids are the polymerization products of octadecapolyenoic acids. The corresponding nitriles may be designated as polyoctadecapolyenonitriles, dioctadecapolyenonitrile and trioctadecapolyenonitrile.

The polyoctadecapolyenonitriles may be obtained either from polymeric fat acids, as outlined above, or they may be obtained by the polymerization of the nitriles of monomeric fat acids derived from the monomeric fat acids by the general methods discussed, followed by removal of unpolymerized monomers.

By reduction, either by hydrogen in the presence of a catalyst or by a chemical reducing agent, such as sodium and alcohol, the polyoctadecapolyenonitrile may be converted to an amine which is called "polyoctadecapolyenylamine." During reduction, the nitrile groups (—CN) are altered to aminomethyl groups (—CH$_2$NH$_2$). Some reduction of the carbon-to-carbon unsaturation in the polyoctadecapolyenonitriles may occur, particularly if reduction is effected by catalytic hydrogenation. Loss of unsaturation does not affect the suitability of the resulting amines for condensation with polymeric fat acids.

Reduction to corresponding amines may also be accomplished for dioctadecapolyenonitriles and trioctadecapolyenonitriles. The products are termed dioctadecapolyenylamine and trioctadecapolyenylamine.

It is to be noted that the amines prepared from polymeric fat acids by the procedures just described contain two or more amino groups per molecule, and may therefore be designated as polyamines.

The products of this invention are obtained, for example, by heating, preferably equimolecular amounts (although an excess of either reactant may also be used), of polyamine with polymeric fat acids, or with an amide-forming derivative of polymeric fat acids.

It is to be understood that this invention is applicable to polymeric fat acids obtained by polymerization of fatty oils, or of various fractions or derivatives thereof, such as the dimeric or mixed dimeric and trimeric fat acids and their amide-forming derivatives.

Satisfactory results are obtained by reacting, for example, polyamines with esters of residual dimeric fat acids, such as their methyl or ethyl esters.

The products of this invention are obtained by reacting the polymeric fat acids or esters with polyamines in approximately equivalent amounts. These amounts may be calculated from titration of the starting materials for their acidity and basicity or by determination of alkoxyl content in the case of polymeric fat acid esters. The reaction is effected by heating the materials at such a temperature that polyaminolysis of the fat esters or the dehydration of the polyamine salts of the fat acids will occur readily. Temperatures of 150° to 200° C. for a few hours with 200° to 250° C. for 1 to 2 hours just prior to removal of polyamide from the reaction chamber are sufficient. The time and temperature will vary depending on materials used and type of product desired.

The reaction is usualy carried out at atmospheric pressure, although toward the end of the reaction, it is advantageous to operate in vacuum. This procedure aids in effecting removal of reaction products and, therefore, in driving the reaction toward completion. If desired, the condensation may be effected in the presence of suitable solvents or dispersing media, provided such media do not interact to any appreciable extent with the other components of the mixture and have boiling points sufficiently high to allow the temperature to be maintained at the desired level.

The polyamides prepared according to our invention are suitable bases for rubber substitutes with good low temperature characteristics. They are soluble in electron acceptor solvents, such as chloroform, alcohols, amines, and organic acids. Aromatic hydrocarbons are excellent secondary solvents with high dilution ratios while petroleum hydrocarbons have sufficiently high dilution ratios to be useful as diluents. Esters, ethers and some ketones are not primary solvents and in most cases are poor secondary solvents.

The following example will illustrate our invention:

A mixture of 16.9 g. of polymeric fat acids and 18.9 g. of polyoctadecapolyenylamine was heated under an atmosphere of nitrogen for 3 hours at 200° C. and for an additional 2 hours at 250° C. The reaction product was a tough, pliable, tacky resin which showed no definite melting point and which was not brittle at 0° C. It was soluble in butanol and could be milled on conventional rolls.

Having thus described our invention, we claim:

1. A polyamide obtained by reacting a member chosen from the group consisting of polymeric fat acids and polymeric fat esters with polyoctadecapolyenylamine at a temperature within the range of 150° C. to 250° C. for a period of several hours.

2. A polyamide obtained by reacting a member chosen from the group consisting of polymeric fat acids and polymeric fat esters with dioctadecapolyenylamine at a temperature within the range of 150° C. to 250° C. for a period of several hours.

3. A polyamide obtained by reacting a member chosen from the group consisting of dimeric fat acids and dimeric fat esters with polyoctadecapolyenylamine at a temperature within the range of 150° C. to 250° C. for a period of several hours.

4. A polyamide obtained by reacting a member chosen from the group consisting of dimeric fat acids and dimeric fat esters with dioctadecapolyenylamine at a temperature within the range of 150° C. to 250° C. for a period of several hours.

HOWARD M. TEETER.
JOHN C. COWAN.

REFERENCES CITED

The following references are of record in the file of this patent:

Falkenburg et al., "Oil and Soap," Journal, June, 1945, pages 143–145.